Jan. 8, 1963　　　L. W. HOCKENBERRY　　　3,072,257

COMBINED GRAVEL COLLECTING AND SCREENING MECHANISM

Filed Aug. 21, 1959

INVENTOR.
LESTER W. HOCKENBERRY
BY John W. Adams
ATTORNEY

3,072,257
COMBINED GRAVEL COLLECTING AND SCREENING MECHANISM
Lester W. Hockenberry, Oakes, N. Dak.
Filed Aug. 21, 1959, Ser. No. 835,333
2 Claims. (Cl. 209—421)

This invention relates to a mechanism for digging, screening, washing and loading gravel and the like in one continuous operation.

It is an object of the present invention to provide a mechanism which combines the features of a bulldozer, a clamshell, a screener and washer, and front-end loader.

It is also an object to provide a mechanism in which a bulldozer is provided with a material collecting member pivotally mounted at the upper end thereof and a screening attachment forming a continuation of the outer end of the collecting member to permit screening of materials picked up by the bucket formed by the bulldozer blade and the collecting member as the same is loaded on to a truck or stockpile.

These and other objects and advantages of this invention will more fully appear from the following description made in connection with the accompanying drawing, wherein like reference characters refer to the same or similar parts throughout the several views, and in which.

Figure 1:
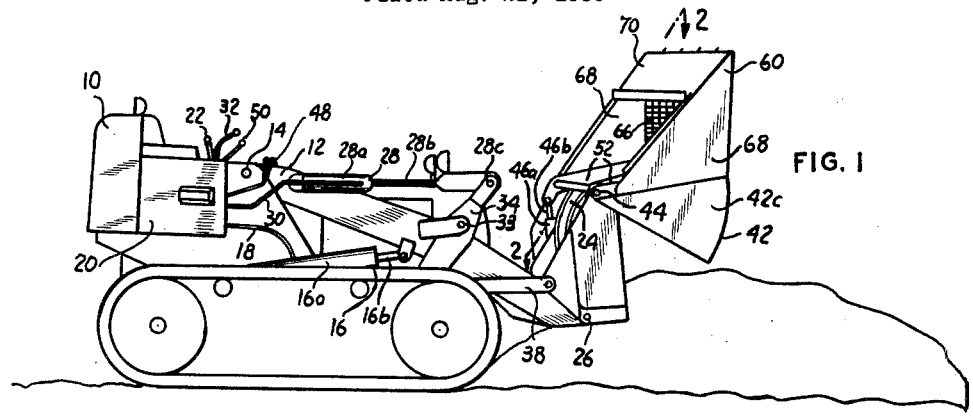
FIG. 1 is a perspective view of a gravel collecting and screening mechanism embodying the present invention.
Figures 2, 3:
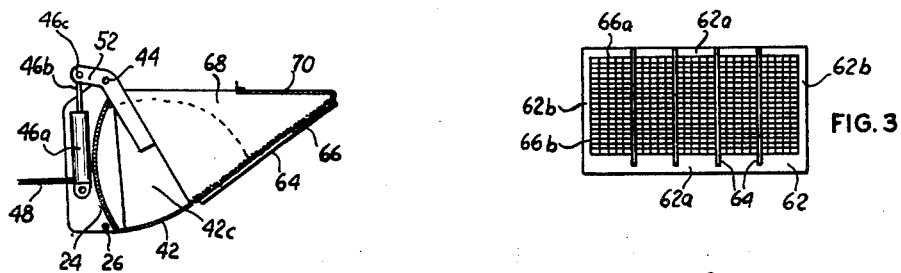
FIG. 2 is a vertical sectional view of the closed material confining bucket taken along the line 2—2 in FIG. 1.
FIG. 3 is a front view of the screening attachment showing the screen supporting frame, the screen and the screen guarding members.

In the form of the invention shown in the accompanying drawing, an earth moving tractor of the type having a clam attachment is shown, designated by the numeral 10. A pair of main support arms 12 are pivotally mounted on pivots 14 upon an upper intermediate portion of the tractor body. The arms 12 extend forward beyond the front end of the tractor 10, and are raised and lowered upon the pivotal axis by a pair of hydraulic rams 16 of conventional design and which respectively consist of a cylinder 16a pivotally mounted upon the body of the tractor and a piston 16b pivotally mounted upon an intermediate portion of one of the arms 12. The piston cylinder 16a connects with a main hydraulic system 20 through a conduit 18 and the piston 16b is moved into the cylinder 16a and thrust outwardly therefrom by actuation of a control lever 22 to respectively lower and raise the arms 12 upon their pivotal axis 14.

A bulldozer blade 24 is pivotally mounted at the lower end thereof 26 upon the front end of each of the main support arms 12.

A pair of hydraulic rams 28 are provided for rotating the blade 24 upon its pivotal axis 26. A hydraulic ram cylinder 28a is pivotally mounted upon an intermediate portion of each of the main support arms 12 and a piston 28b is thrust into the cylinder 28a to rotate the blade 24 in a backward direction and the piston 28b is thrust out from the cylinder 28a to rotate the blade 24 in a forward direction by the actuating arm assembly hereinafter described. A hydraulic conduit 30 interconnects the hydraulic system 20 and the cylinder 28a through which hydraulic pressure is maintained in the cylinder 28a as controlled by an actuating lever 32 for adjustable pivoting of the blade 24.

Figure 4:
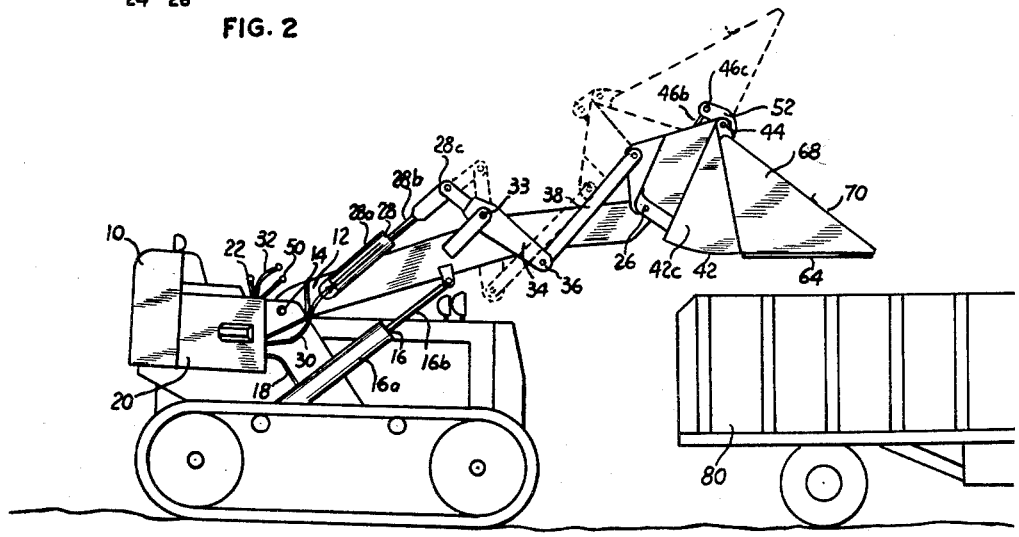
FIG. 4 is a side view of the mechanism shown in FIG. 1 showing the material confining bucket in broken lines elevated above a material receiving truck and showing, in solid lines, the bucket positioned for screening the material therein into the truck.

The outer end 28c of the piston 28b is rotatably connected to the upper end of an actuating rod 34. An intermediate portion 33 of the rod 34 is pivotally attached to an intermediate portion of the main support arm 12. The lower end 36 of the rod 34 is pivotally attached to one end of a blade pivoting arm 38 which is pivotally mounted at the other end thereof to an intermediate portion of the blade 24 as shown in FIGS. 1 and 4. Movement of the piston 28b within the cylinder 28a induced by regulation of hydraulic pressure within the cylinder 28b thereby results in corresponding pivotal movement of the blade 24 upon the pivotal axis 26.

A material collecting member 42 is pivotally mounted upon upper ends 44 of each of the sides thereof upon the corresponding upper ends of the sides of the blade 24, as shown in FIGS. 1 and 4 to form a material confining clam or bucket with said blade 24. A pair of hydraulic cylinders 46a are mounted upon the rear surface of the blade 24 respectively below the pivotal points 44. A hydraulic line 48 connects the cylinder 46a with the main hydraulic system 20, and hydraulic pressure within the cylinder is controlled by actuation of a control lever 50 positioned near the tractor driver's seat. A piston 46b is worked into and out from the cylinder 46a by the regulated hydraulic pressure therein. A pair of curved actuating arms 52 are respectively pivotally connected at one end thereof to the respective outer ends 46c of the pistons 46b. The main body of each of said arms 52 is attached in fixed relation to the corresponding side 42c of the collecting member 42 so that the bucket is opened and closed respectively when the piston 46b is thrust into and moved out from the cylinder 46a.

A screening attachment 60 is attached to the outer edge of the member 42. A screen supporting frame 62 is attached at the lower edge thereof to the outer edge of the member 42 to form a continuation of the lower surface thereof as shown in the drawings. The frame 62 comprises a pair of spaced apart parallel side members 62b and a pair of spaced apart parallel end members 62a disposed normal to said side members to provide a rigid support for the screen 66. The screen 66 is attached to the frame 62 and in the form shown the screen 66 consists of a plurality of spaced apart parallel transverse wires 66a attached at intersecting points to a plurality of longitudinal spaced apart wires 66b to form a screen having a plurality of openings therethrough of predetermined size for screening gravel and other materials.

A plurality of transversely disposed, generally parallel screen protecting members 64 are respectively attached at the upper and lower ends thereof to the upper and lower frame end members 62a outwardly of said screen to guard the screen from damage by bumping against the ground or other objects.

A pair of side panels 68 are attached to respective sides 62b of the frame 62 and to the respective outer edges of the sides 42c of the material collecting member 42 and are tapered therefrom toward the pivotal axis 44 of the clamshell 42 to form continuations of the generally parallel sides 42c of the member 42.

A gravel confining member 70, which in the form shown is a flat panel, extends rearwardly from the outer longitudinal edge of the frame 62 and is attached at respective sides thereof to the side panels 68 to prevent gravel and other materials from spilling over the end of the screen supporting frame when the bucket is rotated to shift the confined material onto the screen 66.

Operation

Materials to be gathered and screened are piled up by the bulldozer blade 24 into a pile as shown in FIG. 1. The bulldozer blade is lowered to the base of the pile of material and the material gathering member 42 is then pivoted downwardly against the lower edge of the blade 24 to close the jaws of the bucket formed thereby and confine the piled up material therein. The main support arms 12 are then elevated upon the pivots 14 to raise the bucket from the ground, and the bucket is positioned above the receptacle for the screened material such as the truck 80, as shown by broken lines in FIG. 4. The bucket is then rotated forwardly upon the pivotal axis 26 of the blade 24 until the materials within the bucket are shifted onto the screen 66 as shown by solid lines in FIG. 4.

The bucket is then rocked back and forth on the pivots 26 to shift the materials therein back and forth across the screen 66 to sift particles smaller than the openings in the screen into the receiving receptacle. After the screening operation residue materials in the bucket may be dumped therefrom onto a stockpile or another truck by opening the jaws of the bucket while held in the same elevated position in which the screening is done.

In the form of the invention shown, the entire screening member is attached to the member 42 by nuts and bolts and is easily removable to permit use of the bucket without the screen. In addition, the screen 66 is easily removable from the screen supporting frame 62 to permit use of screens having different size openings to be interchangeably attached to the screen supporting frame 62. The material collecting member 42 may be maintained in wide open position relative to the blade 24 to permit use of the blade as a conventional bulldozer to pile up materials before picking up such materials in the bucket.

In addition to merely screening materials, the screening mechanism may be used for washing gravel and the like in a simple operation by picking up the material in the bucket, lowering the bucket into wash water and rocking the blade 24 under water to wash the material therein before screening the same.

It will, of course, be understood that various changes may be made in the form, details, arrangements and proportion of parts without departing from the scope of my invention, which generally stated consists in the matter set forth in the appended claims.

What I claim is:

1. A screening mechanism for screening gravel and the like comprising a mobile vehicle, a pair of forwardly extending main arm members pivotally mounted upon said vehicle for pivotal movement upon a horizontal axis, means for raising and lowering said main arm members upon said axis front end portions of said main arms extending beyond the front end of said vehicle, a forward facing earth moving blade pivotally mounted at the lower end thereof upon opposed forward end portions of said main arms, a rearward facing material collecting member pivotally mounted at the upper end thereof to the upper edge of said earth moving blade to form a material confining bucket therewith, means for raising and lowering said collecting member to open and close the bucket, blade rocking means pivotally connected to said blade upwardly of the pivotal axis thereof for rocking said blade upon its pivots, a gravel screening member connected to said material collecting member, a pair of confining side members attached to the sides of said screening member and upper edges of sides of said material collecting member to form a continuation of the sides of said collecting member and a gravel confining member attached to the outer edge of said screening member and extending rearwardly therefrom to prevent materials within the bucket from overflowing past said outer edge when said bucket is rocked back and forth on the pivots of said blade to shift the material confined within said bucket back and forth across said screen.

2. A combined collecting and screening mechanism for solid materials comprising a blade supporting structure, a blade mounted on said structure, means for raising and lowering said blade and means for oscillating said blade on a horizontal axis, a material collecting member pivotally mounted at the upper portion of said blade, a screen formed in the bottom panel of said material collecting member, means for positively opening and closing said collecting member with respect to the lower edge of said blade to form a material confining bucket, a material confining panel in the forward edge of said screen to retain materials collected therein, and means for rocking said blade and said material collecting member back and forth on its horizontal axis when in elevated position to cause the material confined in said bucket to shift back and forth across said screen to provide an efficient screening operation of the material.

References Cited in the file of this patent

UNITED STATES PATENTS

| | | |
|---|---|---|
| 393,295 | Carrico | Nov. 20, 1888 |
| 545,106 | Spicer | Aug. 27, 1895 |
| 1,030,673 | McIllvaine | June 25, 1912 |
| 2,812,595 | Drott | Nov. 12, 1957 |
| 2,919,804 | Robbins | Jan. 5, 1960 |

FOREIGN PATENTS

| | | |
|---|---|---|
| 165,844 | Sweden | Jan. 7, 1959 |